July 13, 1948.                H. DAHL ET AL                2,445,167
                           AUTOMATIC DISK CUTTER
                    Filed May 16, 1945          5 Sheets-Sheet 1

INVENTORS
Harry Dahl
Ernest W. Huebner
BY
Chester F. Carlson
ATTORNEY

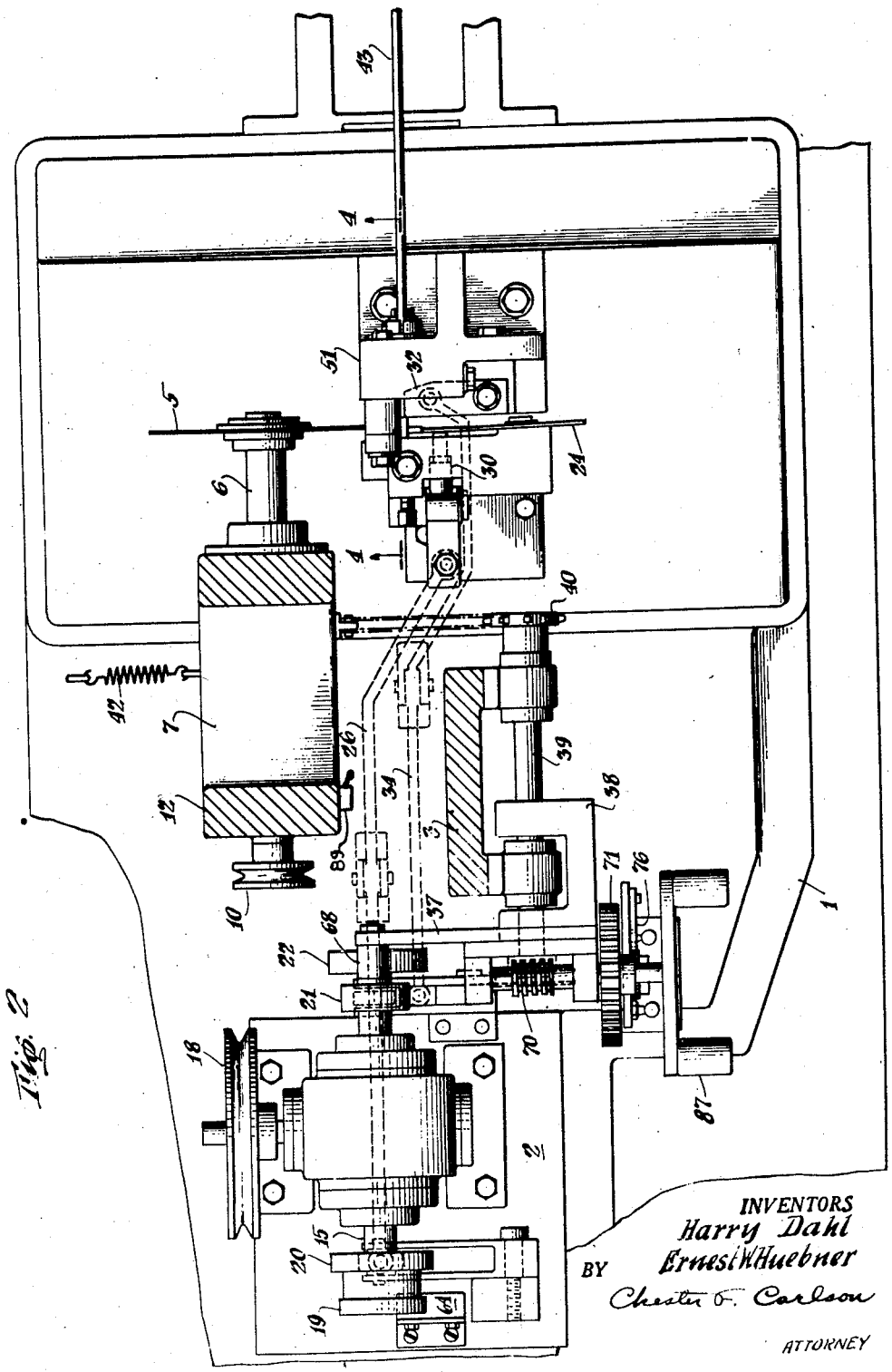

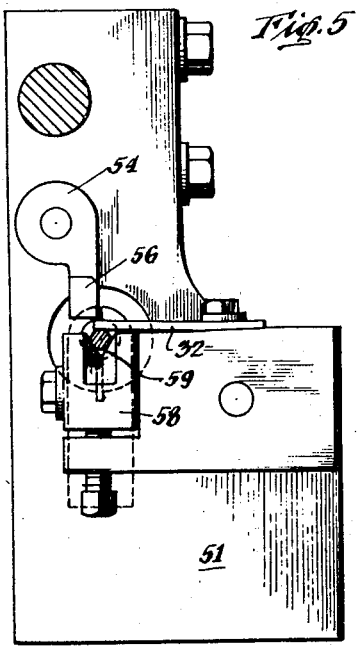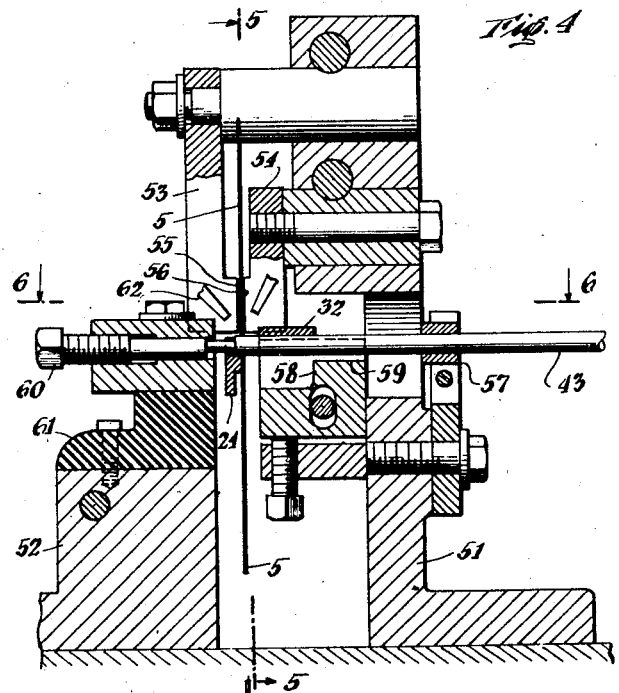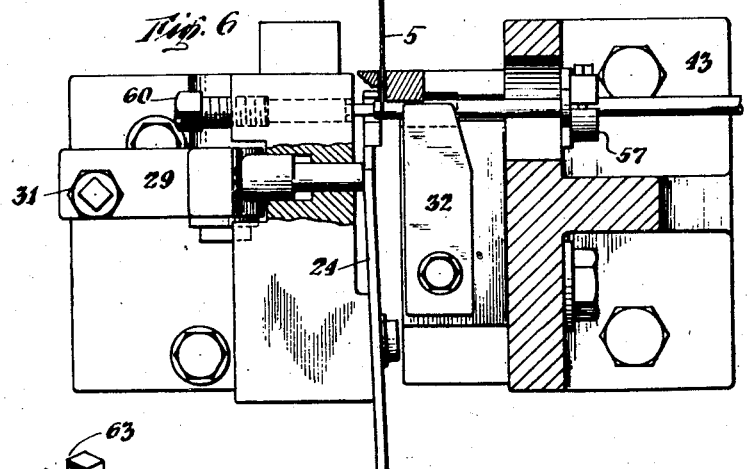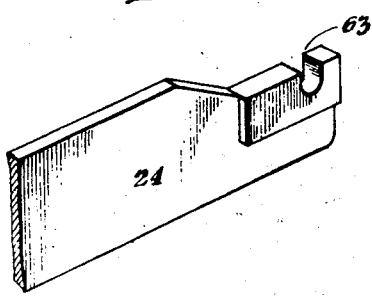

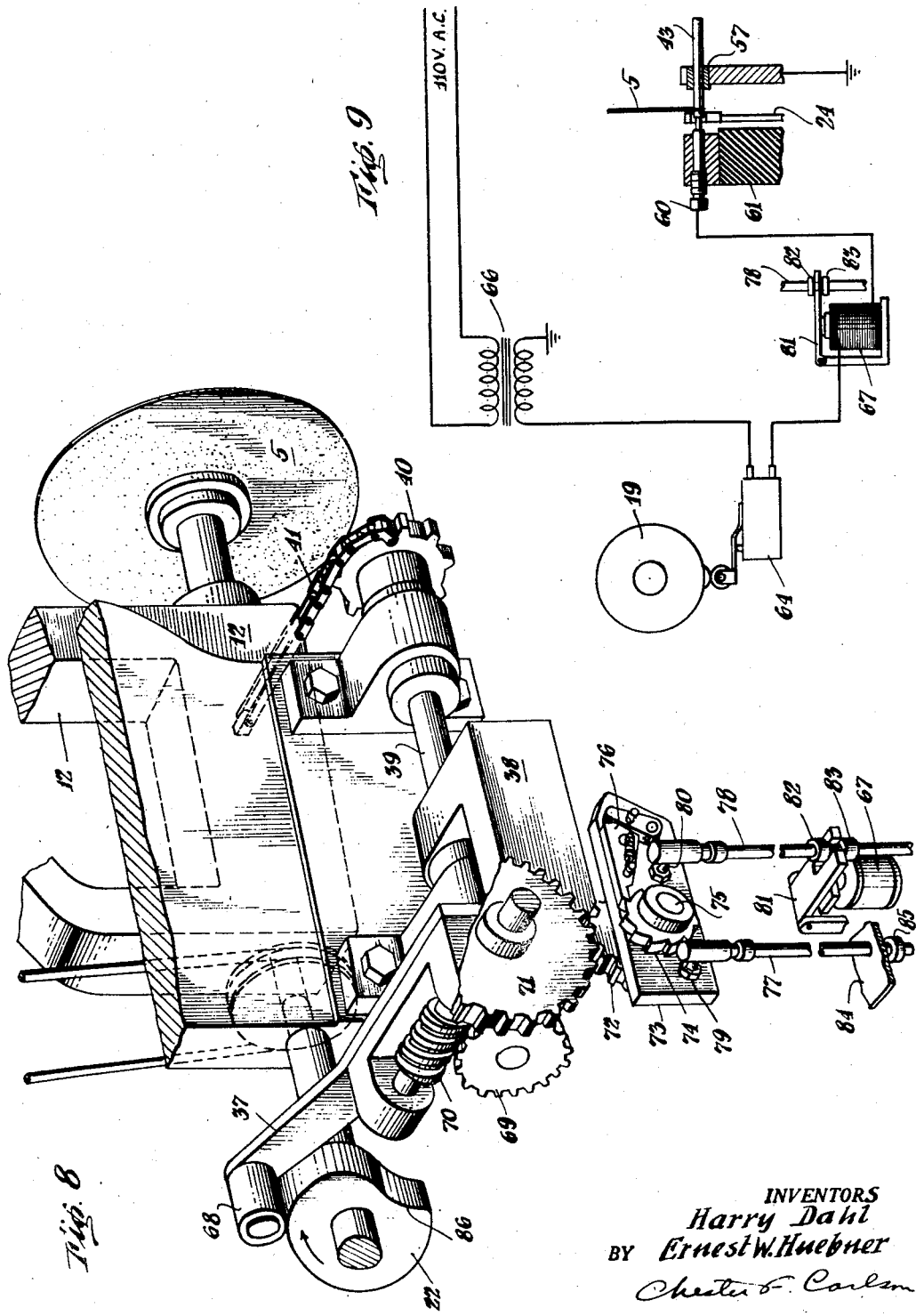

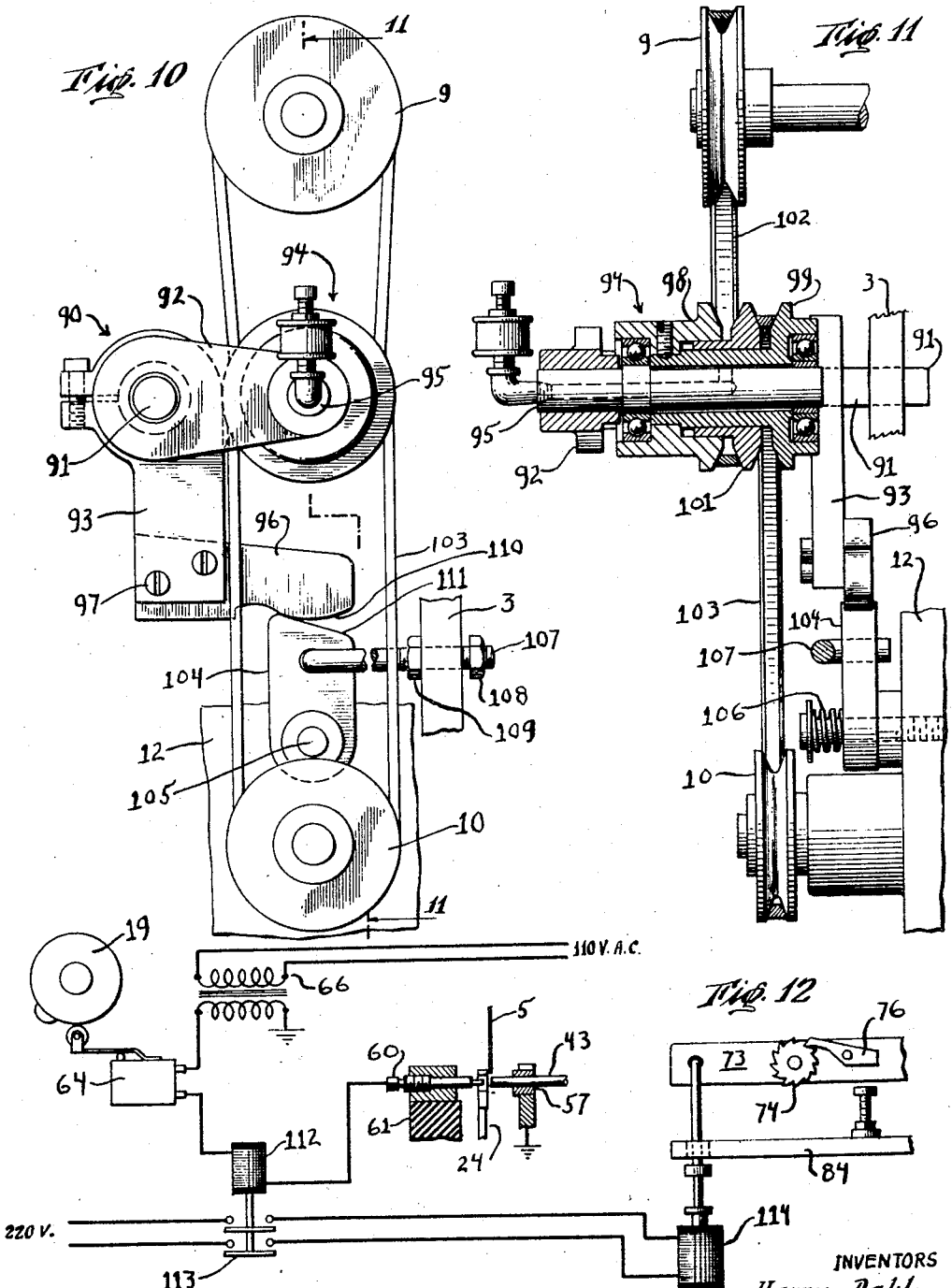

Patented July 13, 1948

2,445,167

UNITED STATES PATENT OFFICE 2,445,167

AUTOMATIC DISK CUTTER

Harry Dahl and Ernest William Huebner, Indianapolis, Ind., assignors to P. R. Mallory & Co., Inc., Indianapolis, Ind., a corporation of Delaware Application May 16, 1945, Serial No. 594,114

14 Claims. (Cl. 51—98)

This invention relates to automatic machines, and has particular reference to means and method of cutting a work member.

An object of this invention is to provide an improved machine for cutting a work member, and methods associated therewith;

Another object is to provide an automatic machine for assuring penetration of a tool through a work member; and A further object is to provide automatic means for varying the speed of rotation of a rotary cutting tool.

Other objects will be apparent from the following description and claims, taken in conjunction with the drawings, in which Figure 1 is a front elevation of a machine embodying this invention;

Figure 2 is a plan view, in partial section, as on line 2—2 of Figure 1, of the machine of Figure 1;

Figure 3 is schematic illustration of the cam system of the machine of Figure 1;

Figure 4 is an illustration of the cutting wheel and work assembly, in vertical section as on line 4—4 of Figure 2;

Figure 5 is an illustration of the assembly of Figure 4 in vertical section as on line 5—5 of Figure 4;

Figure 6 is an illustration of the assembly of Figure 4 in horizontal section as on line 6—6 of Figure 4;

Figure 7 is a perspective of a work supporting arm and rest, shown also in Figures 2, 4, and 6;

Figure 8 is a perspective of an assembly from the machine of the previous figures, operable to change the bodily movement of the cutting wheel relative to the work;

Figure 9 is a schematic diagram of the electrical testing circuit which determines the need of, and actuates, operation of the unit of Figure 8.

Figure 10 is a side elevation of a cutter speed change device;

Figure 11 is a front elevation, in partial section as on line 11—11, of the device of Figure 10; and Figure 12 shows an alternate testing circuit, similar to that shown in Figure 9.

This invention provides many advantages particularly as embodied in the machine used as an illustration in the accompanying specification and drawings:

When the machine is used to cut stock to length it assures that each cut will completely sever the stock, and in addition, will thereafter smooth off the cut faces.

The stock may be any desired material with a suitable cutting tool. For the purpose of illustration, reference is made to cutting tungsten rod.

The rod may be fed to work position without retraction since the supporting arm and rest are movable to permit the workpiece to drop away after severance.

The portion of the rod being cut may readily be flooded with coolant or lubricant because the top of the rod supporting rest is open.

The cutting wheel is provided with long work life since it is operated with uniformity of control force and speed at maximum cutting efficiency and since the machine design permits efficiency in work cooling and lubrication.

The wear on the cutting wheel is uniform since the wheel is advanced against the work throughout its side cutting surface on each cutting cycle. No steps are left in the sides of the wheel.

The peripheral speed of the cutting wheel is automatically increased as the wheel wears down.

The finished workpieces are held to relatively close tolerance due to the operational uniformity and efficiency of the machine.

The machine is automatically stopped when the cutting wheel is worn down or when the work stock achieves a given minimum length.

Further advantages will be apparent from the following specification and claims, and the accompanying drawings.

The machine of the drawings illustrates this invention and comprises:

As in Figures 1 and 2, a supporting base 1, and a main body 2 mounted on base 1, having various uprights and supports thereon on which the operational portions of the machine are mounted.

Upright 3 supports the main drive motor 4 which drives the cutting wheel 5, normally a rubber bonded "carborundum" wheel although others may be used, through the wheel shaft 6 mounted in shaft housing 7. The motor 4 is connected to the wheel shaft 6 by drive belt 8, running on pulleys 9 and 10. The wheel 5 is mounted for bodily swinging motion, toward and from the work, about the shaft 11 as an axis, through frame 12 which is swingably mounted on upright 3 through shaft 11. Wheel shaft housing 7 is a part of frame 12.

Upright 13 supports secondary drive motor 14 which drives cam shaft 15 through drive belt 16 mounted on pulleys 17 and 18. Cam shaft 15 mounts four cams, 19, 20, 21, and 22, see Figure 3. These cams are all fixed on cam shaft 15 and a single rotation of each defines the completion of one cutting cycle by cutting wheel 5. All cams rotate clockwise as indicated by arrow 23, Figure 3.

Cam 19 operates the electrical testing circuit of Figure 9.

Cam 20 operates spring arm 24, Figures 2, 4, 6, 7, and 9, through shaft 25, arm 26 pivoted on body 2 at 27, shaft 28, bell crank lever 29, and pin 30. This shaft and lever system is adjustable through bolt 31 mounted in bell crank 29 and engaging shaft 28.

Cam 21 operates spring clamp 32, Figures 1, 2, 4, 5, and 6, through shaft 33, arm 34 pivoted on body 2 at 35, and shaft 36.

Cam 22 provides swinging action of frame 12 and wheel 5, see Figure 8, through arm 37, frame 38, shaft 39, sprocket wheel 40 and chain 41, against the action of spring 42, Figure 2.

A tungsten rod 43, Figure 1, rests on a platform 44, and is urged to fresh work position before wheel 5 by bracket 45 engaging the tungsten rod end. Bracket 45 is constantly urged against tungsten rod 43 by its connection with weight 46 through cable 47 over wheel 48 which is pivotally mounted at 49 on support 50.

See Figures 4–7. The tungsten rod 43 has its inner end located in cutting position between two uprights 51 and 52, also between which cutting wheel 5 rotates when in cutting position. Wheel guide arms 53 and 54 are mounted on upright 51 and provide wheel guide faces 55 and 56 which keep wheel 5 in proper cutting alignment. A guide and support bearing 57 and a vertically adjustable block 58 position the rod 43 before the cutting wheel 5. Block 58 has a V-groove 59 in which rod 43 rests.

The thickness dimension of the cut-off tungsten rod end is controlled by adjustment of stop screw 60, against the inner, reduced end of which the tungsten rod 43 is abutted. Stop screw 60 is electrically insulated from the body of the machine by insulation block 61, see Figure 9.

Suitable coolant or lubricant jets 62 are positioned to flood the wheel and tungsten rod end during the cut-off operation.

Spring arm 32 normally engages the top of the tungsten rod 43, pressing it into V-slot 59. When rod 43 is to be moved to fresh cutting position, cam 21, as previously indicated, operates to temporarily lift spring arm 32 and permit rod 43 to be again moved against stop screw 60.

Spring rest arm 24 is for the greater part of the cutting cycle held, as in Figures 4 and 6, so that the rest 63 is located below the tungsten rod end and in supporting relation therewith during the cutting operation. Arm 24 is so held through the action of cam 20, as previously indicated. The action of cam 20 is to hold arm 24 as in Figure 6 during the cutting operation and for a brief period after rod 43 has been severed so that continuing operation of the wheel 5 will smooth the cut faces of rod 43. Then cam 20 operates to allow arm 24 to spring away from the wheel 5 and the cut-off piece of tungsten rod drops away from the cutting position, making way for movement of rod 43 to fresh cutting position against screw 60. Thus the feeding movement of rod 43 is linearly unidirectional, no retraction being necessary to permit removal of the cut off piece.

As in Figure 9, cam 19 operates an electrical testing circuit the function of which is to determine the amount of radial wear in the cutting wheel 5 and to actuate the wheel swing adjustment mechanism of Figure 8.

Specifically, cam 19 actuates a microswitch 64 at a point in the cutting cycle as indicated by line 65, Figure 3, before the wheel swing cam 22 reaches its high point of operation. The electrical circuit is supplied with power from a 110 A. C. source, through transformer 66. One side of the transformer secondary is directly grounded and the other is led to ground through microswitch 64, solenoid 67, pin 60, and the tungsten rod 43.

To operate solenoid 67 the circuit must be made through the microswitch 64 and also through the tungsten rod 43. If the wheel 5 is swinging a sufficient distance in its cutting action, the tungsten rod 43 is completely severed at the time the cam 19 closes microswitch 64 and solenoid 67 is not actuated. If the swing of wheel 5 is insufficient, the circuit will be made through the uncut portion of the tungsten rod 43 when microswitch 64 is closed and solenoid 67 actuated. Since cam 22 is then only operating at line 65, the cut off cycle is continued and the tungsten severed as usual. However, the test circuit has indicated that the next cutting swing of the wheel 5 may be insufficient to sever the tungsten, so the adjustment mechanism of Figure 8 is set in operation through the actuation of solenoid 67.

As in Figure 8, cam 22 rotates in a clockwise direction with arm 37 following its contour through roller 68. Variation in the contour of cam 22 thus turns shaft 39 about its longitudinal axis and imparts the same turning motion to the frame 38 which is fixed to shaft 39. Such turning of shaft 39 causes sprocket wheel 40, fixed thereto, to turn and take up or release chain 41, thus bodily swinging wheel 5 as previously described. Gear 69, fixed on the other end of the shaft 39 and in mesh with worm gear 70, turns with shaft 39. Gears 69 and 70 remain in mesh at all times and are moved bodily together about shaft 39 as an axis, by arm 37, with no change in their gearing relation.

When, however, the position of the arc of swing of wheel 5 is to be changed, worm gear 70 is rotated, turning gear 69 and taking up on chain 41, thus causing wheel 5 to approach the tungsten rod so that the normal cam actuated swing of the wheel will then be enough to sever the tungsten. This is accomplished in the following manner:

Gear 71 is fixed on the same shaft as worm gear 70, and is operable to turn gear 70. The unit comprising gear 72, meshed with gear 71, plate 73, and ratchet 74 is pivoted to frame 38 on shaft 75 and the gear and ratchet are fixed together and turn as a body with shaft 75. Plate 73 turns on shaft 75. Thus turning of ratchet wheel 74 varies the bodily swing position of wheel 5. Ratchet wheel 74 is engaged by spring drawn pawl 76 which is mounted on plate 73.

Plate 73 has two freely hanging shafts 77 and 78 mounted on ball and socket joints 79 and 80. As cam 22 tips frame 38 and plate 73 together, shafts 77 and 78 are dropped down. Shaft 78 passes through pivoted solenoid plate 81 and has fixed sleeves 82 and 83 thereon above and below plate 81 so plate and shaft move together. Shaft 77 extends through body plate 84 and has a fixed sleeve 85 thereon so that shaft 77 may be lifted only until sleeve 85 contacts body plate 84. See also Figure 1.

The action is this—when solenoid 67 is actuated it is always at a time when shafts 77 and 78 are moving downward. The solenoid pulls plate 81 down and shaft 78 with it, causing plate 73 to be turned in a clockwise manner and pawl 76 to drop back to a different tooth on ratchet 74. The solenoid energization is only momentary but plate 73 is held in its canted position by the pawl 76 engaging ratchet 74 on a lower tooth. Then, as roller 68 drops on cam face 86, the entire unit is lifted. The canting of plate 73 has already lifted shaft 77 so that sleeve 85 engages plate 84 so the general assembly lift results in a counterclockwise motion of plate 73 and pawl 76, and the consequent turning of ratchet 74 and taking up of a chain 41. The same action may be accomplished manually through use of handle 87, which is fixed on the shaft of gears 70 and 71.

The machine is automatically stopped when the wheel 5 wears down too far to be efficient or when the tungsten rod gets down to a short length of remaining stock. This is accomplished through a suitable electric circuit, not shown, containing switches 88 and 89, Figures 1 and 2 respectively, either switch being capable of shutting off the motor 14. Switch 88 is mounted on the platform 44 and is operated when the bracket 45 advances against it, in advancing the stock 43. Switch 89 is mounted on the swinging frame 12 and is operated by engagement with a portion of the body upright 3, as the frame 12 swings inward in the progression of the cutting action between the cutting wheel and the work. The cutting wheel drive motor 4 is preferably controlled by a separate, manually operated switch but may be included in the shut-off circuit of switches 88 and 89, if desired.

Figures 10 and 11 illustrate the speed changing device of this invention, as applied to the speed of rotation of the cutting wheel, which may be mounted on the machine illustrated in the previous figures. As the wheel wears down to smaller diameters the cutting speed would normally be reduced, but, with the device of Figures 10 and 11, as the cutting of the stock progresses, that is, as the frame 12 swings inward, the speed of rotation of the cutting wheel is progressively increased, in compensation for the peripheral speed reduction of the cutting wheel, due to wear.

The pulley 9 is the drive pulley of the motor 4, as in Figure 1, and the pulley 10 is the cutter wheel pulley as in Figure 2. The speed change pulley unit 90 is mounted on the fixed body upright 3 of the machine on the left end thereof, as looking at Figure 1. The location of this pulley mechanism may readily be understood by noting its relation in Figures 10 and 11, to the pulleys 9 and 10 and the location of pulleys 9 and 10 in Figures 1 and 2.

The speed change pulley unit 90 is mounted on a fixed shaft 91 which is in turn mounted in the machine body upright 3. The unit 90 comprises two arms, 92 and 93 mounted at right angles to each other, for pivotal movement together about the shaft 91 as a center, the change speed pulley 94 mounted on arm 92 by way of shaft 95, and a cam arm 96, angularly fixed to arm 93 by screws 97. Thus, the whole unit 90 is pivotal as a body about the shaft 91.

The speed change pulley 94 is a double pulley, of the V type, with outer side bodies 98 and 99 secured for rotation together by a set screw 100. A central, idler pulley body 101 is mounted between the side bodies 98 and 99, for sliding movement from one to the other. The V belt 102 from the motor pulley 9 engages the side pulley body 98 and one side of the idler 101, and the V belt 103 to the cutter wheel pulley 10 engages the side pulley body 99 and the other side of the idler 101.

With this arrangement, downward gravital movement of the pulley 94 about the shaft 91, causes the belt 102 to be forced radially inwardly on the faces of the pulley bodies 98 and 101. Such movement reduces the effective diameter of these pulley bodies and greater speed of the pulley 94 is obtained without change of the speed of the motor pulley 9. As the belt 102 is thus forced inwardly of the pulley 94, the pulley idler 101 is in consequence slidingly moved along the shaft 95 towards the pulley body 99, narrowing the space between the idler 101 and the pulley body 99 so that the cutter wheel pulley belt 103 is forced radially outward on the faces of the pulley bodies 101 and 99. The pulley 94 effectively is increased in diameter as regards belt 103, and it follows that the speed of the cutter pulley 10 is accordingly increased.

The gravitational fall of the pulley 94 is governed by the action of cam arm 104. Cam arm 104 is pivotally mounted on a shaft 105 which is secured to the cutter wheel swing frame 12. A spring 106 is mounted on the shaft 105 and bears against the cam arm 104 to frictionally restrain the arm with respect to pivotal movement about the shaft 105.

A cam control rod 107 has one end pivotally mounted in the cam arm 104 and the other end slidably extending through a portion of the machine body fixed upright 3 with adjustable nuts 108 and 109 threaded on the rod 107 on opposite sides of the upright portion to limit the sliding movement of the rod 107 through the upright.

The operation of the change speed pulley arrangement is as follows:

Assuming that a new cutter wheel 5, Figure 1, is inserted into the holder 12 and operation of the machine is initiated, the cams 96 and 104, Figure 10, controlling the speed changer 94 are adjusted so as to provide a relatively low speed of operation for the pulley 10 and the cutter wheel. During the initial period of operation, the cutter wheel holder 12 moves cyclically toward and away from the stationary frame portion 3 as the cutter wheel makes successive cuts in the stock. The cam 104 and rod 107 partake of this cyclic movement but do not move relative to the holder 12 as a result of the lost motion provided between the nuts 108, 109 and the stationary frame portion 3. The cam 104 is further maintained in a fixed position with respect to the frame 12 by the pressure of spring 106. The cam surfaces 110, 111 are so shaped that the speed control cam 96 is not moved so long as cam 104 remains in the described fixed position with respect to the support 12. As a result, the speed changer 94 is not actuated in response to the original cyclic movement of the holder 12.

As the diameter of the cutter wheel is reduced by wear to a sufficient extent to prevent complete severance of the stock, the circuit of Figure 9 is actuated thereby energizing solenoid 67, Figure 8, and shifting the cutter wheel holder 12 toward the stock. As a result, the portion of the support 12 shown in Figure 10 shifts toward the stationary frame portion 3, this shifting movement being superimposed upon the normal cyclic movement of the support with respect to the frame. The lost motion between the nuts 108, 109 and the frame 3 is sufficient to permit the normal cyclic movement of the support 12 and rod 107 but not the shifting movement just described. Accordingly, the rod 107 moves leftwardly, Figure 10, with respect to the holder 12 responsive to engagement of the nut 109 with the frame, this leftward movement compensating for the shifting movement of the holder 12 toward the frame. This causes the cam 104 to move in a counterclockwise direction, Figure 10, about its axis 105 to a new position in which it is retained by the pressure of the spring 106. The cam 104 remains fixed in this new position until a further shifting movement is imparted to the holder 12 by another energization of the solenoid 67, Figure 8, and, until such other energization of the solenoid, the cam and rod 107 oscillate back and forth without moving relative to the holder 12 as a result of the lost motion between the nuts 108, 109 and the stationary frame portion 3.

Responsive to the described counterclockwise movement of the cam 104 about its pivot 105, the arm 93 is rocked to actuate the speed changer 94 and increase the speed of the pulley 10 and cutter wheel, this increase in speed compensating for the reduced diameter of the wheel caused by wear. Each time the solenoid 67 is actuated responsive to a further decrease in diameter of the wheel, the holder 12 is shifted toward the stationary frame portion 3 with resultant counterclockwise rotation of cam 104 and actuation of the speed changer 94 to thereby cause a compensating increase in the speed of the wheel.

In Figure 12, the alternate testing and adjusting circuit and mechanism is similar to that shown in Figure 9, previously described herein. A contactor 112 in the 110 volt line operates a switch 113, closing a 220 volt line switch 113 and the solenoid 114 pushes a rod 115 up to turn plate 73 clockwise, causing pawl 76 to drop back to the next tooth on the ratchet wheel 74. As the plate 73 moves bodily downward in the continued operation of the machine, it contacts a fixed post 116 and is thus caused to turn counterclockwise with the consequent turning of the ratchet wheel 74. This action adjusts the swing of the cutter wheel, as previously described herein.

Many variations of this machine may be used without departing from the spirit and scope of the invention, and the particular machine and its details have been described simply by way of illustration.

What is claimed is:

1. In an automatic machine for cutting stock, a support for the stock, a holder, a cutter wheel mounted in said holder, means for cyclically moving the cutter wheel toward and away from the support to thereby form a cut in the stock during each cycle, means for advancing the stock a predetermined distance along the support after each cut, an adjusting device for decreasing the distance between the cutter wheel and the stock independently of said cyclic movement, and means responsive to the penetration of the stock by said cutter wheel for operating said adjusting device.

2. In an automatic machine for cutting stock, a support for the stock, a holder, a cutter wheel mounted in said holder, means for cyclically effecting relative movement between the cutter wheel and the support to thereby form a cut in the stock during each cycle, means for advancing the stock a predetermined distance along the support after each cut, an adjusting device for shifting the cutter wheel toward the stock independently of said cyclic movement, and means responsive to the penetration of said stock by said cutter wheel for operating said adjusting device to move the cutter wheel toward the stock when the latter is not completely severed during the cutting cycle, thereby to compensate for a decrease in the diameter of the cutter wheel due to wear.

3. In an automatic machine for cutting stock, a support for the stock, a holder for a cutter wheel, a cutter wheel mounted in said holder, a pair of guides mounted, respectively, on opposite sides of the cutter wheel and having opposed plane surfaces closely spaced to the cutter wheel to maintain it in proper cutting alignment, means for cyclically moving the cutter wheel toward and away from the support in a path defined by said guides to thereby form a cut in the stock during each cycle, means for advancing the stock a predetermined distance along the support after each cut, an adjusting device for decreasing the distance between the cutter wheel and the stock independently of said cyclic movement, and means responsive to the penetration of the stock by said cutter wheel for operating said adjusting device.

4. In an automatic machine for cutting stock which is formed of conductive material, a support for the stock, a holder, a cutter wheel of insulative material mounted in said holder, means for cyclically effecting relative movement between the cutter wheel and the support to thereby periodically make a cut in the stock, means operable during each cycle to connect the stock in an electrical circuit, said circuit being open if the stock is completely severed by the insulative cutter wheel, said circuit being closed if the cutter wheel has not severed the stock, and a control device responsive to the closure of said circuit.

5. In an automatic machine for cutting stock which is formed of conductive material, a support for the stock, a holder, a cutter wheel of insulative material mounted in said holder, means for cyclically effecting relative movement between the cutter wheel and the support to thereby cut the stock, means operable during each cycle to connect the stock in an electrical circuit, said circuit being open if the stock is completely severed by the insulative cutter wheel, said circuit being closed if the cutter wheel has not severed the stock as a result of a decrease in diameter of said wheel due to wear, and means responsive to the closure of said circuit to shift the cutter wheel holder toward the support.

6. In an automatic machine for cutting stock which is formed of conductive material, a support for the stock, a holder, a cutter wheel of insulative material mounted in said holder, means for cyclically effecting relative movement between the cutter wheel and the support to thereby cut the stock, each cycle consisting of a cutting period, a polishing period during which the wheel rotates in contact with the cut surfaces of the stock, and a return period, means operable during each cycle to momentarily connect the stock in an electrical circuit a short interval before the end of the cutting period, said circuit being open if the stock is completely severed by the insulative cutting wheel, said circuit being closed if the cutter wheel has not severed the stock, and means responsive to the closure of said circuit to shift the cutter wheel holder toward the stock.

7. In an automatic machine for cutting stock which is formed of conductive material, a frame, a support for the stock secured to said frame, a holder pivotally mounted on said frame, a cutter wheel of insulative material mounted in said holder, means for effecting cyclical movement of the cutter wheel holder about its pivot to thereby periodically force the cutter wheel into engagement with the stock, a ratchet and pawl device for effecting intermittent movement of the cutter wheel holder about said pivot, a solenoid for operating said ratchet and pawl device, and means operable during each cycle to connect the stock in an electrical circuit which includes said solenoid, said circuit being open if the stock is completely severed by the insulative cutter wheel, said circuit being closed if the cutter wheel has not severed the stock whereby the solenoid is operated to shift the cutter wheel holder about said pivot and move the cutter wheel closer to the support.

8. In an automatic machine for cutting stock, a support for the stock, a releasable clamp for holding the stock on said support with a portion thereof projecting beyond said support, an arm for supporting the projecting end of the stock, a holder for a cutter wheel, a cutter wheel mounted on said holder, means for effecting relative movement between the cutter wheel and the stock to thereby sever said projecting end, said cutter wheel remaining in contact with the cut surfaces after the stock has been severed to thereby polish said cut surfaces, said arm being effective to support the severed end of the stock during the polishing operation, and means for moving said arm to eject the severed end of the stock after the polishing operation has been completed.

9. In an automatic machine for cutting stock, a support for the stock, a stop, means for urging the stock against the stop, a releasable clamp for holding the stock on said support with a portion thereof protruding beyond said support, an arm for supporting the protruding portion of the stock, a holder for a cutter wheel, a cutter wheel mounted on said holder, means for effecting relative movement between the cutter wheel and the stock to thereby sever said protruding portion, said cutter wheel remaining in contact with the cut surfaces after the stock has been severed to thereby polish said surfaces, said arm being effective to support the severed end of the stock during the polishing operation, and means for moving said arm to eject the severed end of the stock after the polishing operation has been completed, the removal of the said severed end permitting a new section of the stock to be urged into position against said stop.

10. In an automatic machine for cutting stock, a support for the stock, a holder for a cutter wheel, a cutter wheel mounted in said holder, means for effecting relative movement between the cutter wheel and the support to thereby cut said stock, an electric motor for operating the cutter machine, and a control circuit for said electric motor including a pair of switches, either of which is effective to open said circuit, one of said switches being operable when less than a predetermined amount of stock is disposed upon said support, the other of said switches being operable when the cutter wheel is worn away to less than a predetermined diameter.

11. In an automatic machine for cutting stock, a support for the stock, a stop, a member adapted to urge the stock against the stop, a holder for a cutter wheel, a cutter wheel journaled in said holder, means for effecting relative motion between the cutter wheel and the support to thereby cut said stock, an electric motor for operating the cutter machine, and a control circuit for said electric motor including a pair of switches, either of which is effective to open said circuit, one of said switches being operable by said member when less than a predetermined amount of stock is disposed upon said support, the other of said switches being disposed on the cutter wheel holder, said other switch being operable when the cutter wheel is worn away to less than a predetermined diameter.

12. In an automatic machine for cutting stock, a support for the stock, a holder, a cutter wheel mounted in said holder, means for cyclically effecting relative movement between the cutter wheel and the stock to periodically make a cut in the stock, adjusting means for shifting the cutter wheel toward the stock independently of said cyclic movement, an electric circuit responsive to the penetration of said stock by said cutter wheel for controlling the energization of said adjusting means, said circuit energizing said adjusting means to shift the cutter wheel toward the stock when the stock is not completely severed during the cutting cycle, thereby to compensate for a decrease in the diameter of the cutter wheel due to wear.

13. In an automatic machine for cutting stock, a support for the stock, a holder, a cutter wheel mounted in said holder, means for cyclically effecting relative movement between the cutter wheel and the stock to periodically make a cut in the stock, means for moving the stock a predetermined distance along said support after each cut, adjusting means for shifting the cutter wheel toward the stock independently of said cyclic movement, an electric circuit responsive to the penetration of said stock by said cutter wheel for controlling the energization of said adjusting means, said circuit energizing said adjusting means to shift the cutter wheel toward the stock when the stock is not completely severed during the cutting cycle, thereby to compensate for a decrease in the diameter of the cutter wheel due to wear.

14. In an automatic machine for cutting stock which is formed of conductive material, a support for the stock, a holder, a cutter wheel of insulative material mounted in said holder, means for cyclically effecting relative movement between the cutter wheel and the stock to periodically cut the stock, means for moving the stock a predetermined distance along the support after each cut, means operable during each cycle to connect the stock in an electrical circuit, said circuit being open if the stock is completely severed by the insulative cutter wheel, said circuit being closed if the cutter wheel has not severed the stock as a result of a decrease in diameter of said wheel due to wear, and means responsive to the close of said circuit to shift the cutter wheel holder toward the stock.

HARRY DAHL.
ERNEST WILLIAM HUEBNER.

REFERENCES CITED

The following references are of record in the file of this patent:

UNITED STATES PATENTS

| Number | Name | Date |
| --- | --- | --- |
| 344,777 | Croswold | June 29, 1886 |
| 1,228,798 | Maag | June 5, 1917 |
| 1,336,501 | Blanckensee | Apr. 13, 1920 |
| 1,341,818 | Ousrud | June 1, 1920 |
| 1,516,103 | Keller | Nov. 18, 1924 |
| 1,602,680 | Knowles | Oct. 12, 1926 |
| 1,730,938 | Kleeb et al. | Oct. 8, 1929 |
| 1,901,236 | Guild | Mar. 14, 1933 |
| 1,905,651 | Raule | Apr. 25, 1933 |
| 2,049,611 | Harrison | Aug. 4, 1936 |
| 2,163,967 | Strawn et al. | June 27, 1939 |
| 2,176,486 | Bruestle | Oct. 17, 1939 |
| 2,224,055 | Lott | Dec. 3, 1940 |
| 2,361,961 | Pruitt | Nov. 7, 1944 |